(12) United States Patent
Heimala et al.

(10) Patent No.: US 7,494,528 B2
(45) Date of Patent: Feb. 24, 2009

(54) METHOD FOR SMELTING COPPER CONCENTRATES

(75) Inventors: Seppo Heimala, Pori (FI); Mikko Ruonala, Pori (FI)

(73) Assignee: Outotec Oyj, Espoo (FI)

( * ) Notice: Subject to any disclaimer, the term of this patent is extended or adjusted under 35 U.S.C. 154(b) by 391 days.

(21) Appl. No.: 10/564,479

(22) PCT Filed: Jul. 14, 2004

(86) PCT No.: PCT/FI2004/000450

§ 371 (c)(1),
(2), (4) Date: Jan. 13, 2006

(87) PCT Pub. No.: WO2005/007905

PCT Pub. Date: Jan. 27, 2005

(65) Prior Publication Data

US 2006/0207389 A1    Sep. 21, 2006

(30) Foreign Application Priority Data

Jul. 17, 2003   (FI) ................................. 20031082

(51) Int. Cl.
*C22B 3/08* (2006.01)
*C22B 3/10* (2006.01)
*C22B 15/00* (2006.01)

(52) U.S. Cl. .............................. 75/424; 75/718; 75/743

(58) Field of Classification Search ................... 75/424, 75/429, 643, 718, 726, 740, 743, 744; 423/23–46
See application file for complete search history.

(56) References Cited

U.S. PATENT DOCUMENTS

| | | | |
|---|---|---|---|
| 3,632,308 A | | 1/1972 | Klein et al. |
| 3,868,440 A | | 2/1975 | Linblad et al. |
| 3,957,602 A | * | 5/1976 | Johnson et al. ............. 205/582 |
| 4,152,142 A | * | 5/1979 | Schlitt et al. .................. 75/424 |
| 4,717,419 A | * | 1/1988 | Makinen et al. ............... 75/623 |
| 4,917,775 A | * | 4/1990 | Rantapuska et al. ......... 205/775 |
| 5,108,495 A | * | 4/1992 | Heimala et al. ............... 75/386 |
| 5,616,168 A | * | 4/1997 | Gabb et al. .................... 75/718 |
| 6,537,440 B1 | * | 3/2003 | Richmond et al. .......... 205/580 |

FOREIGN PATENT DOCUMENTS

| | | |
|---|---|---|
| CA | 2 363 969 A1 | 5/2003 |
| JP | 2000313924 | 11/2000 |
| WO | 2004/050925 A1 | 6/2004 |
| WO | WO 2004/050925 A1 * | 6/2004 |
| WO | WO 2006/084950 A1 * | 8/2006 |

OTHER PUBLICATIONS

M. Ruonala et al, Different aspects of using electrochemical potential measurements in mineral processing, Int. J. Miner. Process. 52 (1997) p. 97-110.*

* cited by examiner

*Primary Examiner*—Roy King
*Assistant Examiner*—Mark L Shevin
(74) *Attorney, Agent, or Firm*—Buchanan Ingersoll & Rooney PC

(57) ABSTRACT

The invention relates to a method for smelting sulfidic copper concentrates, in which method copper sulfide bearing material is smelted in a smelting furnace (1) for creating blister copper and slag. According to the method, at least part (3) of the feed of the smelting furnace (1) is copper sulfide bearing (3) material obtained by means of sulfide bearing material (2) that is fed into the hydrometallurgic further processing (12, 19) of slag (11) created in the smelting process.

15 Claims, 1 Drawing Sheet

METHOD FOR SMELTING COPPER CONCENTRATES

BACKGROUND

The present invention relates to a method for smelting copper sulfide bearing sulfide concentrates, in which method the slag obtained from the smelting process is treated in at least one hydrometallurgic step.

For treating primary copper raw materials, there are mainly two principal lines. One is the concentration-smelting-electrolytic refining line, and the other is leaching, such as the heap leaching-liquid-liquid extraction and electrolytic recovery line. With respect to reasons connected to raw material quality, environmental protection, geography and economy, both processing lines are meeting growing difficulties.

When starting to concentrate copper-based raw materials, we often face a situation where the majority of the mineralization is oxidized and possibly difficult to flotate. Among these are particularly copper ore deposits containing copper silicates and iron oxides. Also mixed structures with copper sulfide and pyrite may be nearly impossible with respect to flotation. A specific group of problems is represented by finely divided, often pyritic copper-zinc-lead ore deposits. The treatment of said ore deposits by traditional methods usually renders a fairly weak result as regards recoveries and concentrate contents. When the transport expenses to the refinery often are too high even with a high-quality concentrate, they are even more so with a low-quality concentrate. What is more, in that case environmental hazards are increased at two separate locations, for instance because of arsenic. The smelting process itself typically includes many steps, among them smelting for example in a flash smelting furnace, converting, anode furnace treatment; sulfuric acid production for gases, and electric furnace or concentration process for slag. The copper raw material may also be so rich or so poor in iron, that it is turned directly into raw copper, i.e. blister copper, in one smelting step. In that case the obtained slag is conducted to an electric furnace for reduction. From the reduction process, there is obtained a molten copper-iron mixture that is conducted into converting, and slag containing over 0.5% copper. As an alternative, the electric furnace slag is conducted into a concentrator in order to recover the rest of the copper, in which case in the electric furnace, there is produced blister copper that is suited in an anode furnace. Owing to the high copper content of the slag from direct blister copper smelting, being generally 12% by weight or more, and owing to the often high impurity contents, the investments required for this kind of processes are high, and so are the operating costs, for example owing to the price of electricity.

As regards the second prevailing method—processing based on heap leaching—it is likewise facing harder times. As long as the ore neither contains remarkable amounts of precious metals nor remarkable amounts of copper as chalcopyrite, $CuFeS_2$, or as some other component that is hard to dissolve, the situation is fairly good. However, as a rule, a growing share of raw materials even in already functioning mines is particularly formed of slow-dissolving copper minerals. This means increasing costs. Said other method also has another drawback, one to which already built plants gradually have to adjust—i.e. the restricted lifetime of nearly all mines. If the whole process chain from the mine to cathode copper is based on one deposit only, the plant generally faces an unsound situation, as the volume of the ore deposit is gradually used up. As a result, the return of the invested capital is not optimal.

SUMMARY

The object of the present invention is to eliminate drawbacks of the prior art and to achieve an improved method for smelting copper sulfide bearing concentrates, where the slag obtained from the smelting process is treated in at least one hydrometallurgic step for recovering copper. The essential novel features of the invention are enlisted in the appended claims.

According to the invention, copper sulfide bearing raw material together with flux, oxidizing gas and copper raw material obtained from the process circulation are conducted to a smelting furnace in order to manufacture blister copper. At least part of the copper sulfide bearing raw material fed into a smelting furnace, such as a flash smelting furnace, is copper sulfide bearing raw material created in the hydrometallurgic treatment of the slag obtained from the smelting process. The blister copper obtained from smelting is further conducted to the production of pure copper metal. The slag and possible dust material obtained from the smelting of blister copper are conducted into acid leaching carried out in oxidizing conditions, which conditions make the iron contained in the slag to precipitate, and the copper to dissolve. The copper contained in a solution obtained from acid leaching is further conducted to copper removal by conversion, by means of a copper sulfide bearing concentrate. The copper sulfide obtained from copper conversion is returned to be fed back to the direct smelting of blister copper. When necessary, the solution residue from copper removal, containing other valuable metals, such as nickel and zinc, is conducted to one or several conversion steps for recovering the valuable metals, for instance in the presence of iron sulfide.

DETAILED DESCRIPTION OF SPECIFIC EMBODIMENTS

Figure 1:
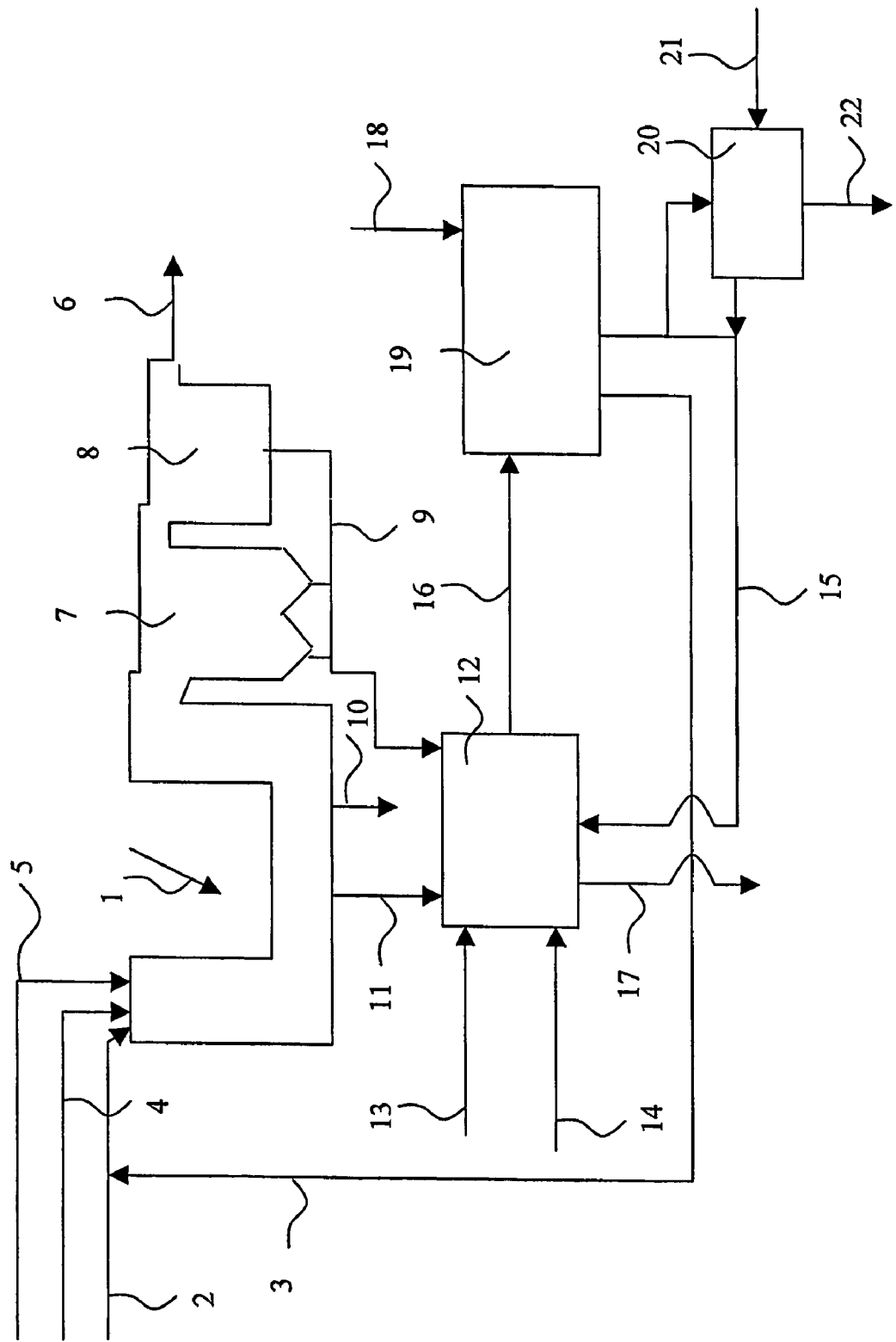
FIG. 1 is a schematic flow diagram of an embodiment of the process disclosed herein.

In the method according to the invention, the raw material containing about 25% copper or more is smelted in one step, advantageously directly to blister copper. In addition to precious metals, such as gold, silver, platinum, palladium and rhodium, the copper raw material going to smelting may also contain an otherwise remarkable quantity of impurities, such as zinc, nickel, cobalt and molybdenum. For example nickel contents may vary within the range 1-2%. The slag used in direct blister copper smelting can be either silicate bearing or ferrite bearing raw material, depending on the composition. Thus, for example if the raw material coming to blister copper smelting contains remarkable amounts of cobalt or nickel, the slag must contain a sufficient amount of components that form spinel structures, such as ferrite.

In the method according to the invention, the slag obtained from blister copper production, as well as advantageously the dust recovered form the copper smelting exhaust gases, are leached. The reagent used in the leaching process depends on the structure and contents of the slag and the dust; most advantageous are solutions or combinations of solutions containing sulfuric acid or hydrochloric acid. Prior to leaching, the slag is granulated and when necessary, ground. In a leach that is advantageously carried out in the temperature range of 50-105° C., there is conducted, in addition to acid, also iron bearing acidic solution created in the conversion step, as well as oxygen bearing gas, for example for oxidizing iron into hematite, goethite or jarosite. An essential thing for the operation of the leaching step is that it is controlled in a way described in the U.S. Pat. Nos. 5,108,495 and 4,561,970, by measuring and adjusting the surface state and reactions of the essential dissolving and precipitating phases by means of mineral-specific potentials, impedance values and solution content values measured by mineral based electrodes. One reason for this procedure is substances, such as tin, antimony and silicon, that are occasionally present in slags and dusts and create surface-active compounds. When the valuable contents of slag and dust are recovered in the solution, the remaining solids are not harmful for the environment after washing and possible further treatment.

The solution obtained from leaching the slag of the blister copper process is conducted to the removal of copper and other valuable ingredients. The removal is carried out by conversion in the temperature range of 80-200° C., advantageously 150-190° C., in atmospheric conditions, or alternatively in autoclave conditions. If autoclave conditions are used, the employed device can be a traditional multichamber reactor, or a so-called pipe autoclave, where the incoming slurry is heated by the out-flowing slurry. The temperature of the process is defined by the solution base and the rates of oxidation/reduction, but also by the quality and grain size of the minerals used in the conversion. Advantageously, for the recovery of copper and other valuable components from the solution, a procedure according to the above mentioned U.S. Pat. No. 5,108,495 also is applied in the conversion step. The conversion is carried out by using for example sulfide phases, such as $CuFeS_2$, $Fe_{1-x}S$, $(Zn,Fe,Mn)S$, $PbS$, $NiS$, $FeS$, depending on the valuable component to be removed. Advantageously the employed sulfide concentrate is classified in a grain size range that is as narrow as possible, so that there is avoided a situation where for example fine chalcopyrite ($CuFeS_2$) grains are turned into $Cu_xS$, and some coarse $CuFeS_2$ grains, that in surface area represent only a small share but in weight a moderate share, react more slowly to $Cu_xS$. Although coarse $CuFeS_2$ would not be ground finer, the average conversion rate is thus increased. With coarser $CuFeS_2$ grains, it is more important than in the average situation to apply the principles of the above mentioned U.S. Pat. Nos. 5,108,495 and 4,561,970 for adjusting the surface structures. Among the advantages brought by the adjusting of surface structures, let us point out the following:

enabling the recycling of acid, $H_2SO_4$, HCl etc., by means of $Fe^{2+}$ salt, owing to a reaction taking place during the conversion and representing the following type:

$$Cu^+/Cu^{2+}+CuFeS_2 \rightarrow Cu_xS+Fe^{2+}+ \qquad (1)$$

as well as owing to the precipitation of iron and release of acid taking place during the leaching of slag, the copper content of the smelting process feed grows, which is important to the economy owing to the improved direct recovery of copper into blister copper,
the use of $CuFeS_2$ makes it possible to use poorer copper raw material in the direct smelting of copper, when said conversion renders rich $Cu_xS$ containing precious metals into the smelting of blister copper, so that in the smelting furnace, there is obtained a less slagging iron, procedures leading to an increase in production can advantageously be carried out also in old plants.

The copper sulfide product, $Cu_xS$ product, obtained in conversion, usually contains 45-75% copper, depending, among others, on the gangue and $FeS_2$ contents of the $CuFeS_2$ concentrate. This copper sulfide obtained from conversion is further conducted as feed to the smelting of blister copper along with the copper concentrate. When so desired, the solution left from the conversion, containing for example zinc, nickel, cobalt and iron, is conducted to a new conversion step, where iron sulfide is added to turn for example the zinc or nickel contained in the solution into respective sulfides. When necessary, the number of conversion steps can be three or more, depending on the quantity of the valuable components to be removed.

The invention is described in more detail below with reference to the appended drawing in which FIG. 1 illustrates a preferred embodiment of the invention, seen as a schematical flow diagram.

According to the invention, into a suspension smelting furnace 1, there is fed copper sulfide concentrate 2, copper sulfide material 3 obtained from the further treatment of the slag from the suspension smelting furnace, oxygen bearing gas 4 and flux 5. The exhaust gases 6 created in connection with the smelting are conducted into a waste heat boiler 7 and to an electric filter 8, where the solids, i.e. dust 9, carried along the exhaust gases 6 are separated from said gases. The blister copper 10 created in connection with the smelting in the suspension smelting furnace 1 is removed from the furnace 1 and conducted to further treatment in order to produce copper metal in a known fashion. On the other hand, the slag 11 created in the suspension smelting furnace 1 is cooled, ground and conducted to leaching 12. Advantageously also the dust 9 recovered from the exhaust gases is conducted to leaching 12. Moreover, sulfuric acid 13 and air 14 are conducted to the leaching step 12, and to the leaching step 12 there is returned iron 15 created in at least one process step following the leaching step 12, said iron being advantageously in a sulfate form in an acidic solution.

In the leaching step 12, the copper contained in the slag 11 is dissolved into copper sulfate 16. On the other hand, the iron contained in the slag 11 is precipitated, and the iron goes to the leaching residue 17. The essentially iron-free sulfate bearing solution 16 created in the leaching step 12 and containing for example copper sulfate is conducted further to the conversion step 19, where there also is fed copper sulfide concentrate 18 for treating the copper contained in the solution by conversion. Advantageously the conversion is carried out according to the following reaction (2) in principle:

$$CuSO_4+CuFeS_2=2Cu_xS+FeSO_4 \qquad (2).$$

The solid copper sulfide ($Cu_xS$) created in the reaction (2) is returned as feed 3 back to the suspension smelting furnace 1. Likewise, the iron sulfate ($FeSO_4$) solution created in the reaction (2) is returned back to the leaching step 12 of the slag obtained from the smelting.

When necessary, the solution removed from the conversion step 19, containing for instance the zinc, nickel and cobalt earlier contained by the slag, is conducted to a new conversion step 20, into which for example iron sulfide 21 is fed in order to enable the conversion, according to the following reactions (3) and (4) in principle:

$$Zn^{2+}+FeS=ZnS+Fe^{2+} \qquad (3)$$

$$Ni^{2+}+FeS=NiS+Fe^{2+} \qquad (4).$$

The iron sulfate solution ($FeSO_4$) created in the reactions (3) and (4) of the conversion step 20 is combined to the solution coming from the conversion step 19 and returned back to the leaching step 12. The precipitated zinc and nickel 22 from the reactions (3) and (4) are conducted further to be processed in a desired form. In case the slag 11 contains more valuable metals, respective conversion steps can be utilized for example for lead and cobalt.

EXAMPLE

According to the method according to the invention, copper sulfide bearing material was fed in a flash smelting furnace, so that the feed contained 68.6 t/h copper sulfide concentrate as well as 31.4 t/h precipitated copper sulfide returned from the conversion step according to the invention. As a result, from the feed there was obtained 32.0 t/h blister copper and 68 t/h slag from the smelting of blister copper.

The slag from the blister copper smelting was conducted into a leaching step, where also was fed sulfuric acid and oxygen, as well as iron sulfate solution created in the further steps of the method. The leaching step was carried out as atmospheric leaching, where the copper was dissolved into sulfuric acid, and the iron was precipitated. The dissolved copper was further conducted to a conversion step, to which there was also fed 25.8 t/h copper sulfide concentrate. Both the copper of the concentrate fed into the conversion step and the copper contained in the solution were by means of conversion turned into sulfide form, which was returned as feed to the flash smelting furnace. The iron dissolved in the conversion was returned back to the copper leaching step to be precipitated. Other valuable metals contained by the slag were conducted to a further conversion step for recovery.

The invention claimed is:

1. A method for smelting sulfidic copper concentrates, in which method copper sulfide bearing material is smelted in a smelting furnace for creating blister copper and slag, wherein at least part of the feed of the smelting furnace is copper sulfide bearing material obtained by means of sulfide bearing material that is fed to a hydrometallurgic processing of the slag created in the smelting process, wherein the hydrometallurgic processing comprises a leaching step and a conversion step, wherein:

the leaching step comprises combining the slag created in the smelting process with sulfuric acid, hydrochloric acid, or a combination of these, a copper-depleted iron sulfate solution, and an oxygen-containing gas, precipitating iron, and producing an iron-depleted copper sulfate solution;

the conversion step comprises combining the iron-depleted copper sulfate solution obtained from the leaching step with a sulfide-containing concentrate, and producing copper sulfide and an iron sulfate solution; and wherein the iron sulfate solution is recycled from the conversion step to the leaching step.

2. A method according to claim 1, wherein the slag obtained from smelting is silicate bearing.

3. A method according to claim 1, wherein the slag obtained from smelting is ferrite bearing.

4. A method according to claim 3, wherein the leaching of the slag is carried out as atmospheric leaching.

5. A method according to claim 4, wherein the leaching of the slag is carried out at the temperature of 50-105° C.

6. A method according to claim 3, wherein the leaching of the slag is carried out in an autoclave.

7. A method according to claim 3, wherein the conversion of the copper, leached from the slag, into sulfide is carried out at the temperature of 90-200° C.

8. A method according to claim 7, wherein the conversion step of converting the copper, leached from the slag, into sulfide is carried out at the temperature of 150-190° C.

9. A method according to claim 3, wherein the leaching step and the conversion step are controlled by measuring and adjusting the surface state and reactions of the essential dissolving and precipitating phases, on the basis of mineral-specific potentials, impedance values and solution content values measured by mineral based electrodes.

10. A method according to claim 1, wherein the sulfide-containing concentrate comprises one or more of $CuFeS_2$, $Fe_{1-x}S$, $(Zn, Fe, Mn)S$, $PbS$, $NiS$, or $FeS$.

11. A method according to claim 1, wherein the copper sulfide produced in the conversion step is recycled to the smelting furnace.

12. A method according to claim 1, wherein the iron sulfate solution is acidic.

13. A method according to claim 1, further comprising recovering dust from a smelting exhaust gas and feeding the dust to the leaching step.

14. A method according to claim 1, further comprising treating the copper-depleted iron sulfate solution to recover zinc or nickel or both, contained therein.

15. A method according to claim 14, wherein the treating of the copper-depleted iron sulfate solution comprises contacting the copper-depleted iron sulfate solution with a sulfide to produce zinc sulfide, nickel sulfide, or both.

* * * * *